United States Patent
Kimura et al.

(10) Patent No.: US 11,078,095 B2
(45) Date of Patent: Aug. 3, 2021

(54) WATER PURIFICATION AGENT AND WATER PURIFICATION METHOD

(71) Applicant: Dexerials Corporation, Tokyo (JP)

(72) Inventors: Kazuhiro Kimura, Tochigi (JP); Koji Hirata, Tochigi (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 16/560,473

(22) Filed: Sep. 4, 2019

(65) Prior Publication Data

US 2019/0389752 A1    Dec. 26, 2019

Related U.S. Application Data

(63) Continuation of application No. 15/516,184, filed as application No. PCT/JP2015/077913 on Oct. 1, 2015, now abandoned.

(30) Foreign Application Priority Data

Oct. 3, 2014  (JP) ................. 2014-204591

(51) Int. Cl.
*B01D 21/01* (2006.01)
*C08L 33/26* (2006.01)
*C02F 1/56* (2006.01)
*C02F 101/20* (2006.01)

(52) U.S. Cl.
CPC ............ *C02F 1/56* (2013.01); *B01D 21/01* (2013.01); *C08L 33/26* (2013.01); *C02F 2101/20* (2013.01)

(58) Field of Classification Search
CPC ........... B01D 21/01; C02F 1/56; C08L 33/26
See application file for complete search history.

(56) References Cited

U.S. PATENT DOCUMENTS

| | | |
|---|---|---|
| 5,945,114 A | 8/1999 | Ogawa et al. |
| 2002/0094299 A1 | 7/2002 | Nguyen et al. |
| 2005/0155667 A1 | 7/2005 | Stegemoeller |
| 2006/0173088 A1 | 8/2006 | Nozaki et al. |
| 2011/0042297 A1 | 2/2011 | Yamamoto et al. |
| 2011/0062630 A1 | 3/2011 | Honda et al. |
| 2013/0299433 A1 | 11/2013 | Inagaki et al. |

FOREIGN PATENT DOCUMENTS

| | | | |
|---|---|---|---|
| CN | 102583681 | 7/2012 | |
| DE | 3908054 A1 * | 9/1990 | ............ C02F 1/5245 |
| EP | 0003119 A1 * | 7/1979 | ............ C02F 1/5236 |
| GB | 1370446 | 10/1974 | |
| JP | S58-198556 | 11/1983 | |
| JP | H02-187104 | 7/1990 | |
| JP | H05-049921 | 3/1993 | |
| JP | H06-099008 | 4/1994 | |
| JP | H11-114313 | 4/1999 | |
| JP | 2007-136405 | 6/2007 | |
| JP | 2009-072670 | 9/2007 | |
| JP | 2011-194384 | 10/2011 | |
| JP | 2011-194385 | 10/2011 | |
| JP | 2014-008428 | 1/2014 | |
| WO | 2012094967 | 7/2012 | |

OTHER PUBLICATIONS

Ennis, Bryan J. "Theory of granulation: an engineering perspective." Handbook of pharmaceutical granulation technology 3 (2010): 6-58. (Year: 2010).*
Cremer Joseph et al—EP-0003119-A1 machine translation (Year: 1979).*
Affonso Alvaro—DE-3908054-A1 machine translation (Year: 1990).*
The Patent Office of the People's Republic of China, First Office Action for corresponding Chinese application No. 201580053265.0, dated Aug. 28, 2018.

* cited by examiner

*Primary Examiner* — Bradley R Spies
(74) *Attorney, Agent, or Firm* — Carmody Torrance Sandak & Hennessey LLP

(57) ABSTRACT

[Solution] Provided is a water purification agent suitable for use in an automated purification treatment device, when a wastewater purification treatment using a plant-derived water purification agent is performed with the automated purification treatment device. The water purification agent is a granulated product containing a mixture of a plant powder and a polymer coagulant.

4 Claims, No Drawings

WATER PURIFICATION AGENT AND WATER PURIFICATION METHOD

TECHNICAL FIELD

The present invention relates to a plant-derived water purification agent used for purifying water such as industrial wastewater, and a water purification method using the water purification agent.

BACKGROUND ART

Various studies are conducted for uses of plant-derived water purification agents for removing unnecessary substances from industrial wastewater and purifying the water. For example, there is proposed a method of adding a coagulant containing: at least any one of mulukhiya, a dried product of mulukhiya, and an extract of mulukhiya; and a polymer coagulant in a suspension to coagulatively separate particles (see, e.g., PTL 1).

Further, in order to remove heavy metal ions from inorganic industrial wastewater, for example, there are proposed methods of separating and removing heavy metal ions included in the wastewater from the wastewater by solid-liquid separation using a leafy vegetable such as mulukhiya or a polymer coagulant or by adsorption to a cation exchanger (e.g., PTLs 2 and 3).

The more the amount of the wastewater to be purified, the more the amount of an unnecessary substance included in the wastewater, or the more the kinds of unnecessary substances included in the wastewater, the more necessary it is to build an automated system for feeding a purification agent necessary for the wastewater purification treatments.

Device automation is an important issue for performing high-speed, stable purification treatments.

On the other hand, there is also a request for saving device costs.

However, techniques hitherto proposed are not at all intended for automated devices for wastewater purification treatments. These techniques have attempted feeding water purification agents to automated devices but have not succeeded in stable and repeatedly accurate supply of the water purification agents having a desired property.

Hence, there is a demand for a water purification agent suitable for use in an automated purification device that is low-cost and capable of supplying a water purification agent having a desired property stably and repeatedly accurately.

CITATION LIST

Patent Literature

PTL 1: Japanese Patent (JP-B) No. 3876497
PTL 2: Japanese Patent Application Laid-Open (JP-A) No. 2011-194384
PTL 3: JP-A No. 2011-194385

SUMMARY OF INVENTION

Technical Problem

The present invention has an object to solve the various problems in the related art and achieve an on object described below. That is, an object of the present invention in performing a wastewater purification treatment using a plant-derived water purification agent with an automated purification device is to provide a water purification agent suitable for use in an automated purification device that is low-cost and capable of supplying a water purification agent having a desired property stably and repeatedly accurately, and a water purification method using the water purification agent.

Solution to Problem

Means for solving the above problems are as follows.
<1> A water purification agent, including:
  a granulated product,
  wherein the granulated product includes a mixture of a plant powder and a polymer coagulant.
<2> The water purification agent according to <1>,
  wherein a plant of the plant powder is at least any one of *Corchorus olitorius* and mulukhiya.
<3> The water purification agent according to <1> or <2>,
  wherein the polymer coagulant is a polyacrylamide.
<4> The water purification agent according to any one of <1> to <3>,
  wherein a bulk specific gravity of the water purification agent is 0.4 g/cm$^3$ or greater.
<5> The water purification agent according to <4>,
  wherein variation of the bulk specific gravity of the water purification agent is 4.5% or less, where the variation is a ratio of a difference between a maximum and a minimum of the bulk specific gravity to the minimum of the bulk specific gravity.
<6> The water purification agent according to any one of <1> to <5>,
  wherein a content ratio between the plant powder and the polymer coagulant in the water purification agent is from 1/1 through 9/1 on a basis of a mass ratio (plant powder/polymer coagulant).
<7> The water purification agent according to any one of <1> to <6>,
  wherein the water purification agent is produced by a producing method including:
    a plant powder producing step of grinding a dried plant to obtain the plant powder having a number average particle diameter of 250 μm or less; and
    a granulating step of mixing the plant powder with the polymer coagulant, adding water to the plant powder and the polymer coagulant, kneading the plant powder and the polymer coagulant, and subjecting the resultant to extrusion granulation to obtain the granulated product.
<8> A water purification method, including:
  dissolving the water purification agent according to any one of <1> to <7> in water to obtain a dispersion liquid in which the plant powder and the polymer coagulant are dispersed, and feeding the dispersion liquid to wastewater to remove an unnecessary inorganic substance included in the wastewater.

Advantageous Effects of Invention

The present invention can solve the various problems in the related art and achieve the object described above, so when a wastewater purification treatment using a plant-derived water purification agent is performed with an automated purification device, the present invention can provide a water purification agent suitable for use in an automated purification device that is low-cost and capable of supplying a water purification agent having a desired property stably and repeatedly accurately, and a water purification method using the water purification agent.

DESCRIPTION OF EMBODIMENTS

Water Purification Agent

A water purification agent of the present invention is made of a granulated product containing a mixture of a plant powder and a polymer coagulant.

"Water purification" as used in the present invention refers to removal of unnecessary substances such as nickel, copper, and fluorine included in wastewater. Targets of water purification include industrial wastewater, particularly, inorganic industrial wastewater.

When the water purification agent is added in the wastewater, unnecessary inorganic substances in the wastewater are coagulatively separated by the water purification agent. When the resultant coagulated matter is removed from the wastewater, the wastewater is purified.

<Plant>

The plant is not particularly limited so long as the plant can coagulatively separate unnecessary substances (e.g., nickel, copper, and fluorine) included in wastewater. Examples of the plant include *Corchorus olitorius*, mulukhiya, Japanese mustard spinach, Japanese honewort, potherb mustard, and spinach. Among these plants, *Corchorus olitorius* and mulukhiya are preferable, and *Corchorus olitorius*, which exhibited a good result in Examples described below, is more preferable for use.

Any part of a plant such as leaf, stalk, and root may be used. However, leaf is more preferable for use.

<Polymer Coagulant>

The polymer coagulant is not particularly limited so long as the polymer coagulant exhibits an effect of removing unnecessary substances (e.g., nickel, copper, and fluorine) included in wastewater, like the plant. Examples of the polymer coagulant include polyacrylamides, partially hydrolyzed salts of polyacrylamides, sodium alginate, sodium polyacrylate, and sodium salt of CMC (carboxymethyl cellulose). Among these polymer coagulants, polyacrylamides are preferable for use. As the polyacrylamides, for example, commercially available products FLOPAN AN 905, FLOPAN AN 926, and FLOPAN AN 956 (available from SNF Inc.) may be used.

<Granulated Product of Mixture of Plant Powder and Polymer Coagulant>

With use of a granulated product containing a mixture of a plant powder and a polymer coagulant as the water purification agent, stable and repeatedly accurate supply of a water purification agent having a desired property with an automated purification device becomes possible.

The present inventors studied an automated system for a wastewater purification device using a water purification agent made of a plant powder, and found that use of a water purification agent made of a plant powder and a polymer coagulant was accompanied by a problem described below.

In an automated system, various water purification agents used for wastewater purification treatments are stored in automated supplying machines, and then quantified by a quantitative machine, so the water purification agents are fed in predetermined amounts into wastewater in a reaction tank. Here, when any water purification agent is a solid, that water purification agent is once dissolved in a dissolving tank before sent to the reaction tank, and then sent to the reaction tank. That is, a solid water purification agent present in an automated supplying machine is quantified by the quantitative machine, fed into the dissolving tank, and dissolved in a predetermined amount of water in the dissolving tank under stirring. The resultant dispersion liquid is sent to the reaction tank and fed to wastewater.

In terms of costs, etc., as compact a device as possible is preferable, and it is preferable to use a smaller number of automated supplying machines.

On the other hand, in order to improve the water purification performance, use of both of a water purification agent made of a plant and a water purification agent made of a polymer coagulant is preferable.

Hence, both of the water purification agents, namely a plant powder and a polymer coagulant were put in one automated supplying machine to attempt feeding to the automated device. As a result, it was found that the plant powder and the polymer coagulant were separated in the automated supplying machine because a specific gravity difference between the both was extreme (particularly, a bulk specific gravity difference was extreme), and that it was impossible to weigh out the water purification agents at the desired blending ratio. Unless at the desired blending ratio, a satisfactory water purification effect may not be obtained. Such water purification agents cannot be said to be water purification agents having a good performance.

Further, when quantification was performed repeatedly in the state that the two kinds of water purification agents were separated, the water purification agents obtained were at a different blending ratio every time and had uneven water purification performance. It was impossible to weigh out the water purification agents at the desired blending ratio repeatedly accurately.

Furthermore, the plant powder had a particularly low bulk specific gravity. Therefore, when quantifying the water purification agent containing the plant powder having such a low bulk specific gravity with an automated supplying machine, it was necessary to feed the water purification agent to the quantitative machine until the water purification agent reached a predetermined mass. Hence, quantification consumed time and electricity. It was disadvantageous to weigh out the water purification agent having a low bulk specific gravity with an automated supplying machine.

The present inventors conducted various experiments in relation with the problem described above, and have found an embodiment of a water purification agent suitable for use in an automated purification device configured to purify water.

That is, it has been found that a water purification agent made of a granulated product containing a mixture of a plant powder and a polymer coagulant can solve the problem described above.

The water purification agent of the present invention is a granulated product. Therefore, the water purification agent has a good fluidity and does not clog the automated supplying machine and the quantitative machine. The quantitated water purification agent can be stably supplied into the dissolving tank.

Further, the water purification agent of the present invention is obtained by granulating a plant powder and a polymer coagulant at a desired ratio. Therefore, the water purification agent can achieve the expected water purification effect.

Furthermore, the water purification agent of the present invention is obtained by granulating a mixture of a plant powder and a polymer coagulant. Therefore, the water purification agent has a relatively high bulk specific gravity and a small variation in the bulk specific gravity.

The water purification agent has a small variation in the bulk specific gravity and can be repeatedly quantified with a small variation in the blending ratio from one quantification to another. Therefore, a water purification agent having no unevenness in the water purification performance can be obtained.

When used in an automated purification device, the water purification agent of the present invention can overcome the problem arising from the specific gravity difference between the plant powder and the polymer coagulant. The water purification agent containing the plant powder and the polymer coagulant at the desired blending ratio can be weighed out repeatedly accurately.

The bulk specific gravity of the water purification agent of the present invention is considerably higher than the bulk specific gravity of a water purification agent obtained by simply mixing a plant powder and a polymer coagulant (this fact is demonstrated by the results of Examples 1 to 3 compared with Comparative Examples 1 to 3 in the Example section below). This saves time and electricity taken for quantification and effectively facilitates application of the water purification agent of the present invention to an automated purification device.

The content ratio between the plant powder and the polymer coagulant in the water purification agent is preferably from 1/1 through 9/1 on the basis of a mass ratio (plant powder/polymer coagulant).

In order to satisfy the water purification performance, it is preferable that the content ratio of the plant powder in the water purification agent be 1/1 or greater on the basis of a mass ratio (plant powder/polymer coagulant). In order to make the bulk specific gravity of the water purification agent relatively high, it is preferable that the content ratio be 9/1 or less on the basis of a mass ratio (plant powder/polymer coagulant).

When the content ratio between the plant powder and the polymer coagulant in the water purification agent is in the range described above, the water purification agent has a good water purification performance and a high bulk specific gravity and exhibits a good result with a small variation in the bulk specific gravity.

The forms (diameter and length) of the granulated product are not particularly limited and may be appropriately selected in relation with a producing method described below. However, in order to adapt the granulated product to a wide range of the size of feeding ports of commercially available quantitative machines, the diameter of the granulated product is preferably 3 mm or less and the length of the granulated product is preferably 3 mm or less. Further, in order to make the granulated product smoothly passable through the feeding port, and also in consideration of solubility in the dissolution, the diameter of the granulated product is more preferably 1 mm or less and the length of the granulated product is more preferably 1 mm or less.

«Property of Water Purification Agent»

The bulk specific gravity of the water purification agent is 0.4 g/cm$^3$ or greater.

When the water purification agent has a bulk specific gravity of 0.4 g/cm$^3$ or greater, an automated system for which the present invention is intended can save time and electricity taken for quantification. This effectively facilitates application of the water purification agent to an automated purification device.

The bulk specific gravity can be obtained in the manner described below.

[Bulk Specific Gravity]

The bulk specific gravity can be measured with POWDER TESTER PT-N TYPE (available from Hosokawa Micron Corporation).

A sample (100 cc) is calmly poured into a 100 cc stainless cup, and the specific gravity of the sample at the moment is measured as the bulk specific gravity.

Variation of the bulk specific gravity (variation being a ratio of a difference between a maximum and a minimum of the bulk specific gravity to the minimum of the bulk specific gravity) of the water purification agent is preferably 4.5% or less.

When the variation of the bulk specific gravity of the water purification agent is 4.5% or less, an automated system for which the present invention is intended can perform repeatedly accurate supply of the water purification agent having a small variation in the blending ratio and no unevenness in the water purification performance. This effectively facilitates application of the water purification agent to an automated purification device.

The variation of the bulk specific gravity can be obtained in the manner described below.

[Variation of Bulk Specific Gravity]

The water purification agent, which is the measurement sample, is poured into a bag having a certain size (e.g., a 700 mm×500 mm plastic bag), and the opening of the bag is heat-sealed. Here, the amount of the water purification agent to be poured into the bag is considered in a manner to secure a space in the bag enough for the water purification agent to move freely in a shaking operation to follow. Next, the water purification agent put in the bag is shaken up and down so as not to break the granulated product. Subsequently, the sample is taken out from the bag from 5 positions including the top and bottom portions of the bag, and the bulk specific gravity of each is measured.

The maximum and the minimum of the bulk specific gravity are recorded, and the variation is obtained according to the following calculation based on the maximum and the minimum.

(Difference between maximum and minimum of bulk specific gravity/minimum of bulk specific gravity)×100

«Method for Producing Granulated Product»

The water purification agent is produced according to a producing method including: a plant powder producing step of grinding a dried plant to obtain a plant powder having a number average particle diameter of 250 μm or less; and a granulating step of mixing the plant powder with a polymer coagulant, kneading the plant powder and the polymer coagulant while adding water, and subjecting the resultant to extrusion granulation to obtain a granulated product.

For obtaining a plant powder, first, a plant may be dried by sun drying or drying with a drier until the water content becomes 5% or less. Next, the dried plant is ground with, for example, an atomizer (hammer mill available from Dalton Co., Ltd.) to a number average particle diameter of 250 μm or less.

Here, the number average particle diameter can be measured with, for example, MORPHOLOGI G3 (available from Malvern Instruments Ltd.).

Meanwhile, a polymer coagulant is prepared. The size of the polymer coagulant may be anything that is smaller than or equal to the size of the granulated product. When a commercially available polymer coagulant has a size smaller than or equal to the size of the granulated product, the commercially available polymer coagulant can be used as is. A polymer coagulant greater than or equal to the size of the granulated product may be ground to a desired size with, for example, an atomizer (hammer mill available from Dalton Co., Ltd.).

Next, the plant powder obtained above and the polymer coagulant are mixed and kneaded with addition of water. The amount of water to be added is preferably, for example, from 15% by mass through 250% by mass of the total mass of the mixture of the plant powder and the polymer coagulant.

As the yardstick for adding water to the mixture, it is preferable that the mixture to which water is added not easily loosen apart when grasped in a hand but remain as some shape.

As the yardstick for the amount of water to be added, the amount of water to be added is higher as the mixing ratio of the polymer coagulant is higher because the polymer coagulant absorbs much water. For example, when the mixture is at a mixing ratio by mass (plant powder/polymer coagulant) of 9/1, water is added in an amount of 15% by mass of the total mass of the mixture. When the mixture is at a mixing ratio by mass of 3/1, water is added in an amount of 20% by mass of the total mass of the mixture. When the mixture is at a mixing ratio by mass of 1/1, water is added in an amount of 82% by mass of the total mass of the mixture.

The kneader/granulator is not particularly limited, and a commercially available granulator may be used. Examples of the commercially available granulator include an extruding granulator (disk pelleter available from Dalton Co., Ltd.).

After kneading, the kneaded product is extruded by the granulator, to obtain a granulated product. The diameter of the granulated product is preferably 3 mm or less. The granulated product is dried by a fluidized bed drier until the water content becomes 5% or less.

Subsequently, the granulated product is cut into equal pieces having a predetermined length (preferably, a length of 2 mm or less) by a power mill P3 type crusher (available from Showa Kagaku Kikai Co., Ltd.). In this way, the water purification agent of the present invention that is made of the granulated product obtained by mixing the plant powder and the polymer coagulant is obtained.

Water Purification Method

A water purification method of the present invention is a method of dissolving the water purification agent of the present invention described above in water to obtain a dispersion liquid in which the plant powder and the polymer coagulant are dispersed, and feeding the dispersion liquid to wastewater to remove an unnecessary inorganic substance included in the wastewater.

The water purification agent is quantified by a quantitative machine and then supplied into a dissolving tank.

In the dissolving tank, the water purification agent is dissolved in a predetermined amount of water. The obtained water purification agent dispersion liquid is sent to a reaction tank and fed to wastewater. In the reaction tank, an unnecessary inorganic substance (e.g., nickel, copper, or fluorine) included in the wastewater is coagulatively separated by the plant powder and the polymer coagulant. When the coagulated matter is removed, the wastewater is purified.

EXAMPLES

The present invention will be described more specifically below by way of Examples and Comparative Examples. However, the present invention should not be construed as being limited to these Examples.

In Examples, bulk specific gravity and variation of bulk specific gravity were obtained in the manners described below.

[Bulk Specific Gravity]

Bulk specific gravity was measured with POWDER TESTER PT-N TYPE (available from Hosokawa Micron Corporation).

A sample (100 cc) was calmly poured into a 100 cc stainless cup, and the specific gravity of the sample at the moment was measured as the bulk specific gravity.

[Variation of Bulk Specific Gravity]

A water purification agent, which was the measurement sample, was poured into a 700 mm×500 mm plastic bag, and the opening of the bag was heat-sealed. Next, the water purification agent put in the bag was shaken up and down. Subsequently, the sample was taken out from the bag from 5 positions including the top and bottom portions of the bag, and the bulk specific gravity of each was measured.

The maximum and the minimum of the bulk specific gravity were recorded, and the variation was obtained according the following calculation based on the maximum and the minimum.

(Difference between maximum and minimum of bulk specific gravity/minimum of bulk specific gravity)×100

Example 1

Chinese-grown *Corchorus olitorius* was dried by sun drying until the water content became 5% or less.

Next, the dried plant was ground with an atomizer (hammer mill, available from Dalton Co., Ltd.) to a number average particle diameter of 250 µm or less, to obtain a plant powder.

Polyacrylamide powder (FLOPAN AN 956 available from SNF Inc.) was used as a polymer coagulant.

The plant powder and the polymer coagulant were mixed at a plant powder polymer coagulant mixing ratio of 1/1 on the basis of a mass ratio (plant powder/polymer coagulant). The mixture was kneaded with addition of water in an amount of 82% by mass of the total mass of the mixture.

The kneaded product was extruded by an extruding granulator (disk pelleter available from Dalton Co., Ltd.), to obtain a granulated product. With the granulator having a dies size (φ) of 2 mm, a granulated product having a diameter of about 2 mm was obtained. This granulated product was dried by a fluidized bed drier until the water content became 5% or less, and then cut by a power mill P3 type crusher to have a length (L) of about 2 mm, to obtain a granulated product 1.

The measurements described above were performed for the granulated product 1, to obtain bulk specific gravity (maximum and minimum) and variation of bulk specific gravity. The results are presented in Table 1.

<Evaluation of Effectiveness of Application to Automated Supplying Machine>

From the viewpoint of saving time and electricity taken for quantification by adjusting the bulk specific gravity to a relatively high value, the bulk specific gravity of the water purification agent was classified based on the criteria described below (evaluation was based on the minimum), and effectiveness (1) of application to an automated purification device was evaluated. The result is presented in Table 1.

—Evaluation Criteria—
A: The bulk specific gravity was 0.4 g/cm³ or greater.
B: The bulk specific gravity was 0.33 g/cm³ or greater but 0.4 g/cm³ or less.
C: The bulk specific gravity was less than 0.33 g/cm³.

From the viewpoint of enabling repeatedly accurate supply of a water purification agent having a small variation in the blending ratio and no unevenness in the water purification performance, the bulk specific gravity of the water purification agent was classified based on the criteria described below, and effectiveness (2) of application to an automated purification device was evaluated. The result is presented in Table 1.
—Evaluation Criteria—
A: The variation of the bulk specific gravity of the water purification agent was 1% or less.
B: The variation of the bulk specific gravity of the water purification agent was greater than 1% but 4.5% or less.
C: The variation of the bulk specific gravity of the water purification agent was greater than 4.5% but 6% or less.
D: The variation of the bulk specific gravity of the water purification agent was greater than 6% but 10% or less.
E: The variation of the bulk specific gravity of the water purification agent was greater than 10%.

Example 2

A water purification agent was obtained in the same manner as in Example 1, except that unlike in Example 1, the plant powder and the polymer coagulant were mixed at a plant powder:polymer coagulant mixing ratio of 3/1 on the basis of a mass ratio (plant powder/polymer coagulant) and the mixture was kneaded with addition of water in an amount of 20% by mass of the total mass of the mixture.
In the same manner as in Example 1, bulk specific gravity (maximum and minimum) and variation of bulk specific gravity were obtained, and effectiveness of application to an automated supplying machine was also evaluated. The results are presented in Table 1.

Example 3

A water purification agent was obtained in the same manner as in Example 1, except that unlike in Example 1, the plant powder and the polymer coagulant were mixed at a plant powder:polymer coagulant mixing ratio of 9/1 on the basis of a mass ratio (plant powder/polymer coagulant) and the mixture was kneaded with addition of water in an amount of 15% by mass of the total mass of the mixture.
In the same manner as in Example 1, bulk specific gravity (maximum and minimum) and variation of bulk specific gravity were obtained, and effectiveness of application to an automated supplying machine was also evaluated. The results are presented in Table 1.

Comparative Example 1

Using the plant powder and the polymer coagulant of Example 1, a non-granulated product was obtained by mixing the plant powder and the polymer coagulant at a plant powder:polymer coagulant mixing ratio of 1/1 on the basis of a mass ratio (plant powder/polymer coagulant). The non-granulated product was the water purification agent of Comparative Example 1.
In the same manner as in Example 1, bulk specific gravity (maximum and minimum) and variation of bulk specific gravity were obtained, and effectiveness of application to an automated supplying machine was also evaluated. The results are presented in Table 1.

Comparative Example 2

A non-granulated water purification agent was obtained in the same manner as in Comparative Example 1, except that unlike in Comparative Example 1, the plant powder:polymer coagulant mixing ratio was 3/1 on the basis of a mass ratio (plant powder/polymer coagulant).
In the same manner as in Example 1, bulk specific gravity (maximum and minimum) and variation of bulk specific gravity were obtained, and effectiveness of application to an automated supplying machine was also evaluated. The results are presented in Table 1.

Comparative Example 3

A non-granulated water purification agent was obtained in the same manner as in Comparative Example 1, except that unlike in Comparative Example 1, the plant powder polymer coagulant mixing ratio was 9/1 on the basis of a mass ratio (plant powder/polymer coagulant).
In the same manner as in Example 1, bulk specific gravity (maximum and minimum) and variation of bulk specific gravity were obtained, and effectiveness of application to an automated supplying machine was also evaluated. The results are presented in Table 1.

TABLE 1

| | Bulk specific gravity (g/cm³) | | Evaluation of effectiveness (1) | Variation of bulk specific gravity (%) | Evaluation of effectiveness (2) |
|---|---|---|---|---|---|
| | Maximum | Minimum | | | |
| Ex. 1 | 0.429 | 0.411 | A | 4.4 | B |
| Ex. 2 | 0.442 | 0.439 | A | 0.7 | A |
| Ex. E3 | 0.426 | 0.423 | A | 0.7 | A |
| Comp. Ex. 1 | 0.329 | 0.290 | C | 13.4 | E |
| Comp. Ex. 2 | 0.268 | 0.198 | C | 35.4 | E |
| Comp. Ex. 3 | 0.233 | 0.175 | C | 33.1 | E |

From the results of Table 1, it was confirmed that the water purification agents of the present invention made of the granulated product of the mixture of the plant powder and the polymer coagulant had relatively high bulk specific gravities and small variations in the bulk specific gravities.
As a result of confirmation by the present inventors, the bulk specific gravity of the *Corchorus olitorius* powder was 0.15 g/cm³, and the bulk specific gravity of the polymer coagulant was 0.75 g/cm³. The bulk specific gravity of the mixture of these materials was from about 0.18 g/cm³ through about 0.33 g/cm³ as proved in Comparative Examples 1 to 3. By making the water purification agents of the present invention as a granulated product of the mixture of these materials, it was possible to make the bulk specific gravity of the water purification agents higher than these values by some degree.

<Evaluation of Water Purification Performance>

Water purification performance of the water purification agents of Examples was evaluated by a method of coagulatively precipitating nickel ions from an acidic solution in which nickel ions (20 ppm) were dissolved.
First, ferric chloride (50 ppm) was added to a solution under stirring with a jar tester at 150 rpm. Continuously, sodium hydroxide was added to adjust pH to from 9 through 10, to perform first coagulation.

Next, for second coagulation, the water purification agent of Example 1, the water purification agent of Comparative Example 1, and a water purification agent (as Comparative Example 4) made only of the polymer coagulant (FLOPAN AN 956 available from SNF Inc.) used in Example 1 were each added in an amount of 10 ppm, and the solution was stirred at a rotation speed of 50 rpm for 2 minutes. The supernatant was picked 1 minute after stirring was stopped, and the nickel concentration of the supernatant was measured with LAMBDA (A) 9000 (available from Kyoritsu Chemical-Check Lab., Corp.). The results are presented in Table 2.

TABLE 2

| | |
|---|---|
| Ex. 1 | Less than 1 ppm (less than or equal to measurement limit of Λ 9000) |
| Comp. Ex. 1 | Less than 1 ppm (less than or equal to measurement limit of Λ 9000) |
| Comp. Ex. 4 | 3.31 ppm |

As can be seen from the results of Table 2, it was confirmed from the result of Comparative Example 1 that substitution of *Corchorus olitorius* for 50% of the water purification agent (Comparative Example 4) made only of the polymer coagulant resulted in a better water purification performance (nickel coagulative precipitation performance). It was also confirmed from the result of Example 1 that this level of water purification performance was also retained by the embodiment in the form of the granulated product of the mixture of the plant powder and the polymer coagulant.

It was confirmed that the water purification agent of the present invention made of the granulated product containing the mixture of the plant powder and the polymer coagulant exhibited an excellent water purification performance.

The invention claimed is:

1. A water purification method, comprising:
   obtaining the water purification agent by:
   a) grinding a dried plant to obtain a plant powder having a number average particle diameter of 250 μm or less; and
   b) mixing the plant powder with a polymer coagulant, adding water to the plant powder and the polymer coagulant, kneading the plant powder and the polymer coagulant, and subjecting a resultant to extrusion granulation to obtain the granulated product;
      wherein the water purification agent comprises the granulated product,
      wherein the granulated product comprises a mixture of the plant powder and the polymer coagulant,
   obtaining a dispersion liquid in which the plant powder and the polymer coagulant are dispersed in an automated supplying machine, and
   feeding the dispersion liquid to wastewater to remove an unnecessary inorganic substance in the wastewater in an automated purification device;
   wherein a bulk specific gravity of the water purification agent is 0.4 g/cm$^3$ or greater; and
   wherein variation of the bulk specific gravity of the water purification agent is 4.5% or less, where the variation is a ratio of a difference between a maximum and a minimum of the bulk specific gravity to the minimum of the bulk specific gravity.

2. The water purification method according to claim 1, wherein a plant of the plant powder is at least any one of *Corchorus olitorius* and mulukhiya.

3. The water purification method according to claim 1, wherein the polymer coagulant is a polyacrylamide.

4. The water purification method according to claim 1, wherein a content ratio between the plant powder and the polymer coagulant in the water purification agent is from 1/1 through 9/1 on a basis of a mass ratio (plant powder/polymer coagulant).

* * * * *